United States Patent
Bishop

(10) Patent No.: US 9,444,975 B2
(45) Date of Patent: Sep. 13, 2016

(54) IMAGE SENSOR GAMUT MAPPING

(71) Applicant: Imagination Technologies Limited, Kings Langley (GB)

(72) Inventor: Michael D. Bishop, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 13 days.

(21) Appl. No.: 14/637,521

(22) Filed: Mar. 4, 2015

(65) Prior Publication Data

US 2015/0256719 A1    Sep. 10, 2015

(30) Foreign Application Priority Data

Mar. 4, 2014 (GB) .................................. 1403759.2

(51) Int. Cl.
*H04N 1/60* (2006.01)
*H04N 9/68* (2006.01)

(52) U.S. Cl.
CPC .......... *H04N 1/6058* (2013.01); *H04N 1/6008* (2013.01); *H04N 9/68* (2013.01)

(58) Field of Classification Search
CPC .................................................. H04N 1/6058
USPC ....................................................... 382/167
See application file for complete search history.

(56) References Cited

U.S. PATENT DOCUMENTS

| | | | | |
|---|---|---|---|---|
| H001506 H | * | 12/1995 | Beretta | G06F 3/04845 345/549 |
| 6,519,361 B1 | * | 2/2003 | Taillie | H04N 1/6016 358/515 |
| 7,081,899 B2 | * | 7/2006 | Shimazaki | G09G 5/006 345/589 |
| 7,298,892 B2 | * | 11/2007 | Spaulding | H04N 1/6077 345/207 |
| 7,554,556 B2 | * | 6/2009 | Minamino | H04N 1/60 345/581 |
| 7,916,938 B2 | * | 3/2011 | Bezryadin | G09G 5/026 382/162 |
| 7,924,292 B2 | * | 4/2011 | Bujold | G09G 5/02 345/427 |
| 8,643,664 B2 | * | 2/2014 | Matsuoka | H04N 9/67 345/589 |
| 2008/0055333 A1 | | 3/2008 | Matsuoka et al. | |
| 2009/0033677 A1 | | 2/2009 | Bezryadin | |

* cited by examiner

*Primary Examiner* — Ishrat I Sherali
(74) *Attorney, Agent, or Firm* — Vorys, Sater, Seymour and Pease LLP; Vincent M DeLuca

(57) ABSTRACT

Gamut mapping is applied to a pixel to thereby convert input component values (e.g. RGB values) of the pixel to corresponding output component values of the pixel. The input component values have a first valid range which includes some negative values and the output component values have a second valid range which does not include negative values. The gamut mapping unit determines whether a first input component value of the pixel is negative, and if so: (i) applies an adjustment to that component value such that it is not negative; and (ii) adjusts one or more other input component value(s) of the pixel based on the adjustment applied to the first input component value to thereby compensate for the adjustment applied to the first input component value. The output component values of the pixel are based on the adjusted input component values of the pixel.

20 Claims, 6 Drawing Sheets

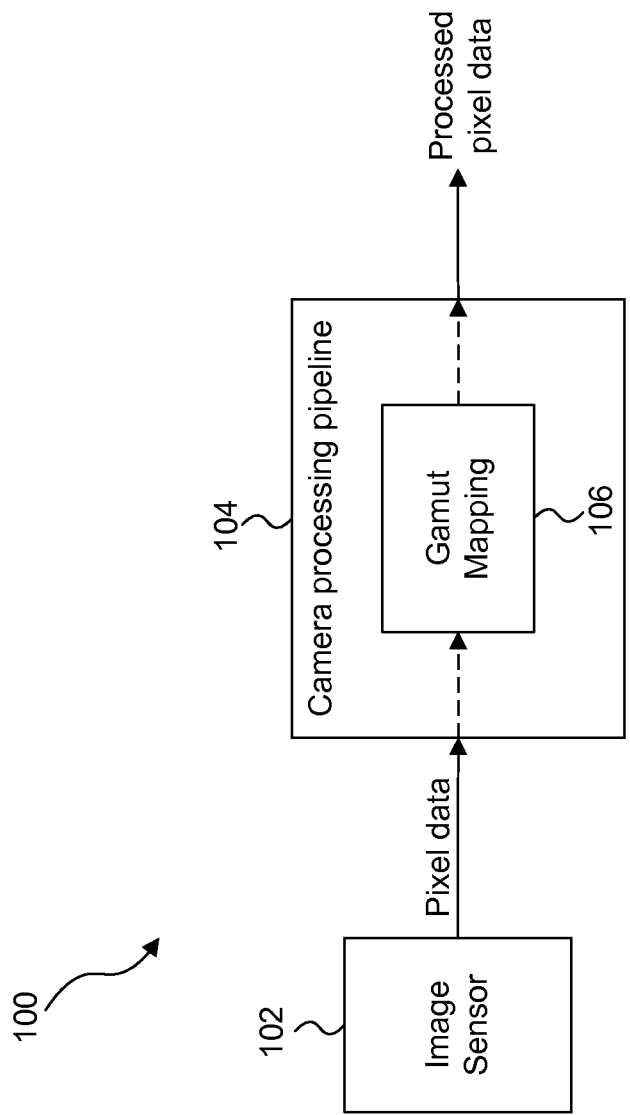

IMAGE SENSOR GAMUT MAPPING

BACKGROUND

Image sensors are used to sense light at an array of different pixel positions in order to capture an image representing a scene. Some examples of types of image sensors are complementary metal-oxide-semiconductor (CMOS) image sensors and charge-coupled device (CCD) image sensors. Colour filters may be used such that the different pixels represent intensities in different colour channels, such as Red (R), Green (G) or Blue (B) colour channels. A de-mosaicing process can be performed to determine a full set of colour values (or "component values") for each pixel, e.g. by interpolation. Methods for performing de-mosaicing are known in the art, and result in a set of component values (e.g. RGB values) for each of the pixels.

An image captured by an image sensor may be displayed on a display, for example when a camera captures an image and displays the captured image on the display of the camera. Often the image sensor's gamut (which may be referred to as a "colour gamut") exceeds the gamut of the display. The gamut of an image sensor defines the complete subset of colours which can be represented by the combination of the component values of a pixel captured by the image sensor. Similarly the gamut of a display defines the complete subset of colours with which a pixel can be displayed on the display. sRGB is a standard RGB colour space which uses the ITU-R BT.709 primaries to define the chromaticity of the Red, Green and Blue component values, and is suitable for use, for example, on displays. The colour filters used in an image sensor will determine the primaries of the colour space of the component values (e.g. RGB values) representing the pixels of an image captured by the image sensor.

Since the image sensor's gamut often exceeds the gamut of the display, a process of compressing the gamut of a pixel's component values may be used to bring the component values of a pixel captured by an image sensor into the gamut of the display. For example, component values which are outside of the display gamut may be clipped such that they lie within the display gamut. However, since clipping is only applied to component values which lie outside the range allowed by the display gamut, some component values of a pixel may be changed while others are not. This may result in poor hue accuracy and other perceptually detrimental artefacts in the resulting component values of the pixel. For example, clipping component values in this way could cause colour flatness (i.e. loss of detail) in areas of an image where all the colours are close to the edge of the allowed display gamut.

Another option for compressing the gamut of a pixel's component values to bring them into the gamut of the display is to scale the component values of the pixel by a scaling factor (which is less than one), such that all of the component values of the pixel are reduced by the same factor. In this way, the ratio between the different component values of the pixel is maintained. However, scaling will reduce the intensity of colours within the display gamut, which can detrimentally change pixel colours which were already within the display gamut before the scaling.

Therefore, there are problems with both clipping and scaling as methods for compressing the gamut of a pixel's component values to bring them into the gamut of the display.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of applying gamut mapping to a pixel to thereby convert a plurality of input component values of the pixel to a corresponding plurality of output component values of the pixel, wherein the input component values are in a first format which has a first valid component value range which includes some negative values and wherein the output component values are in a second format which has a second valid component value range which does not include negative values, wherein the method comprises: determining whether one of the input component values of the pixel is negative; and if it is determined that said one of the input component values is negative: (i) applying an adjustment to said one of the input component values such that the adjusted one of the input component values is not negative; and (ii) adjusting one or more of the other input component values of the pixel based on the adjustment applied to said one of the input component values to thereby compensate for the adjustment applied to said one of the input component values, wherein the output component values of the pixel are based on the adjusted input component values of the pixel.

There is provided a gamut mapping unit configured to apply gamut mapping to a pixel to thereby convert a plurality of input component values of the pixel to a corresponding plurality of output component values of the pixel, wherein the input component values are in a first format which has a first valid component value range which includes some negative values and wherein the output component values are in a second format which has a second valid component value range which does not include negative values, wherein the gamut mapping unit comprises an adjusting module which comprises: a first adjustment block configured to: determine whether one of the input component values of the pixel is negative; and if it is determined that said one of the input component values is negative, apply an adjustment to said one of the input component values such that the adjusted one of the input component values is not negative; and a second adjustment block configured to adjust one or more of the other input component values of the pixel based on the adjustment applied to said one of the input component values to thereby compensate for the adjustment applied to said one of the input component values, wherein the gamut mapping unit is configured to output the output component values of the pixel, wherein the output component values of the pixel are based on the adjusted input component values of the pixel.

There may be provided computer readable code adapted to perform the steps of any of the methods described herein when the code is run on a computer. Furthermore, there may be provided computer readable code for generating a gamut mapping unit according to any of the examples described herein. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 1 is a schematic diagram of an image processing system;

Figure 2A:
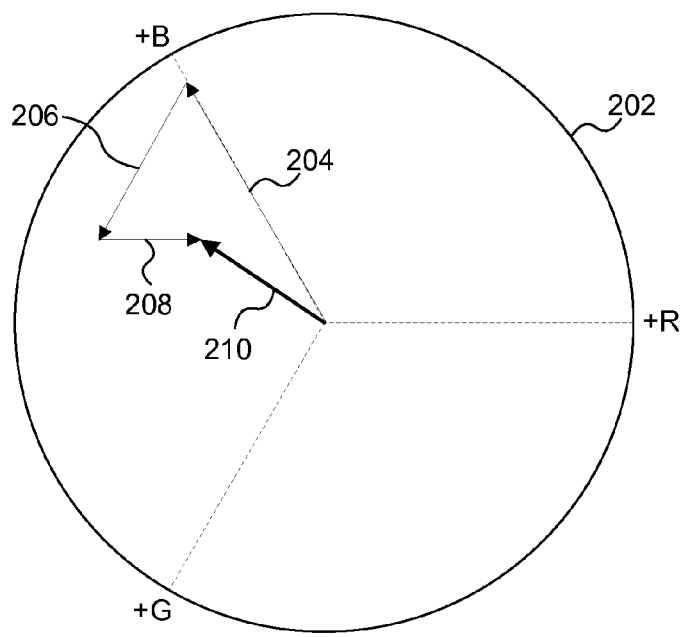
FIG. 2a is a two-dimensional (2D) representation of the colour of a pixel determined from the component values of the pixel in a first example.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

Clipping and scaling are described above as options for compressing the gamut of a pixel's component values to bring them into the gamut of the display, but as described above, both of these methods have problems. Another option for compressing the gamut of a pixel's component values to bring them into the gamut of the display (or any other desired gamut) is "gamut mapping." Gamut mapping is a compromise between clipping and scaling which attempts to compress out-of-range component values into the normal range of the display gamut in a way that adequately preserves hue and maintains some extra colour saturation. For example, for pixels which have component values which are in a core region (i.e. not close to the boundary of the display gamut), the component values may be left substantially unchanged such that the gamut mapping does not perceptually alter the colour of those pixels. However, for pixels which have component values which are outside of the core region (i.e. close to or outside of the display gamut), the component values are scaled down to fit within the remainder of the display gamut. If it is the case that the display gamut does not include any negative values but the image sensor gamut does allow some negative values, then scaling is not, on its own, able to convert all of the image sensor pixel values (in the image sensor gamut) into display pixel values (in the display gamut). That is, scaling is not able to convert a negative component value to be within the display gamut because the scaling factor is not negative and the scaling factor is the same for each component value of a pixel.

Methods are described herein for handling the case of converting component values (e.g. RGB values) of a pixel from a first format which allows negative component values into a second format which does not allow negative component values. Gamut mapping can then be applied to scale some of the component values to arrive at output component values which comply with the second format. In particular, methods of applying gamut mapping to component values of a pixel are described herein to thereby convert a plurality of input component values of the pixel to a corresponding plurality of output component values of the pixel. In an example, the input component values have an extended range (e.g. the input component values are within the range from −0.5 to 1.5) and the output component values have an unextended range (e.g. the output component values are within the range from 0 to 1) so that the component values for the pixel lie within a display gamut.

FIG. 1 shows an image processing system 100 which includes an image sensor 102 and a camera processing pipeline 104. The image processing system 100 may be implemented in a device, such as a camera. The image sensor 102 is configured to capture pixel data and provide the pixel data to the camera processing pipeline 104. The image sensor 102 may capture a sequence of images, which can then be used to represent frames of a video sequence. The pixel data may be in one of many different possible formats, for example the pixel data may comprise Red, Green or Blue (RGB) values to represent the intensity of the respective three colour channels at respective pixel positions.

The camera processing pipeline 104 comprises a number of processing units for processing the pixel data, including a gamut mapping unit 106. Processed pixel data is output from the camera processing pipeline 104, and may be used in any suitable manner, e.g. output to a display, stored in memory, etc. The gamut mapping unit 106 is configured to apply gamut mapping to the pixel data. In an example, the gamut mapping unit 106 applies gamut mapping to each pixel separately without consideration of the position of the pixel within an image. As described above, the image sensor 102 may provide one component value (e.g. Red, Green or Blue) for each pixel position and the camera processing pipeline 104 may comprise some logic for performing de-mosaicing in order to determine all of the component values for each pixel position. Alternatively, the image sensor 102 could provide all of the component values of a pixel to the camera processing pipeline 104. In both cases, the pixel data for a pixel received at the gamut mapping unit 106 comprises a plurality of input component values, e.g. three component values. In the examples described in detail herein the component values of a pixel received at the gamut mapping unit 106 are RGB values.

The input RGB values received at the gamut mapping unit 106 may use the same primaries as the output RGB values which are output from the gamut mapping unit 106. As an example, the RGB values may use the BT.709 primaries. In some examples, the camera processing pipeline 104 may include a processing unit for converting the colour space of the pixel data prior to passing the pixel data to the gamut mapping unit 106 to ensure that the input RGB values received at the gamut mapping unit 106 use the same primaries as the output RGB values which are output from the gamut mapping unit 106. As an example, the output RGB values may be in an unextended RGB format, such as a format using the sRGB colour space, which has a valid component value range from 0.0 to 1.0. The input RGB values may be in an extended RGB format, such as a format using the xvYCC extended gamut, which has a valid component value range from −0.5 to 1.5. The extended range allows the input RGB values to represent colours outside the BT.709 primary triangle, e.g. colours that are more saturated than normal gamut colours, which can be useful for processing the pixel data. However, it may be useful, e.g. if the pixels are to be displayed, for the gamut mapping unit 106 to map the pixel component values to lie within an unextended gamut, e.g. to lie within the sRGB colour gamut.

In three-dimensional RGB colour space, the hue and saturation of a pixel are represented by the vector sum of the RGB components. The angle of the resultant vector indicates the hue, and the magnitude represents the saturation. FIG. 2a is a two-dimensional (2D) representation of the colour of a pixel determined from the component values of the pixel in a first example. The 2D representation of the pixel colour shown by the circle in FIG. 2a is a convenient representation of the RGB colour space which is useful in explaining the principles of the examples described herein, but does not necessarily show the exact colour of a pixel since the full (i.e. 3D) RGB colour space has been reduced to a convenient 2D representation. The directions of positive red, positive green and positive blue are indicated in FIG. 2a by "+R", "+G" and "+B", and the circle 202 has a radius of magnitude one. The blue component of the pixel is represented as the arrow denoted 204, the green component of the pixel is represented as the arrow denoted 206 and the red component of the pixel is represented as the arrow denoted 208. The R, G and B components of the pixel are all positive within the range from 0 to 1, and for example may be in the sRGB format. The resultant colour of the pixel is represented with the vector 210. An indication of the hue of the pixel is given by the angle of the vector 210 and an indication of the saturation of the pixel is given by the magnitude of the vector 210. Therefore the vector 210 represents a pixel with a bluish cyan hue which has a saturation of approximately half of the maximum that can be represented in the sRGB format. It can be appreciated that the Red component value is the smallest of the three component values of the pixel (i.e. arrow 208 is shorter than arrows 204 and 206), and the small positive Red component results in some desaturation of the cyan colour represented by vector 210.

Figure 2B:
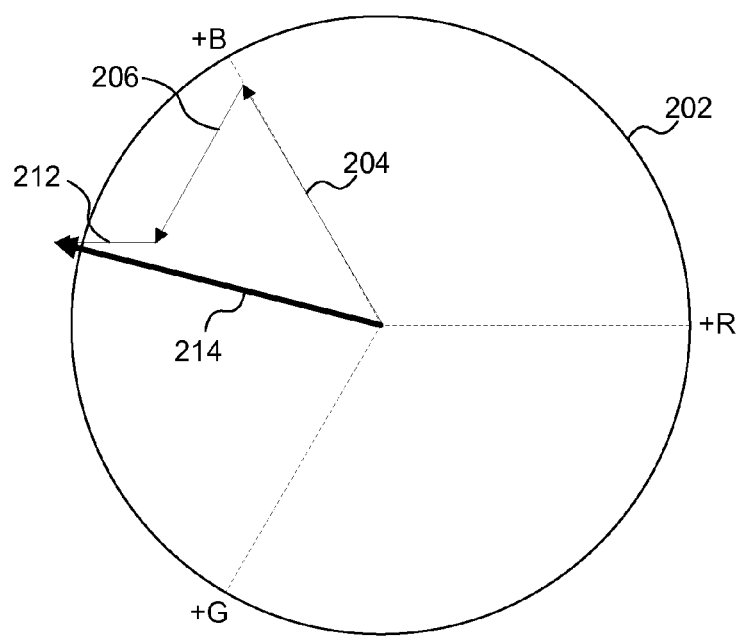
FIG. 2b is a 2D representation of the colour of a pixel determined from the component values of the pixel in a second example.
Figure 3:
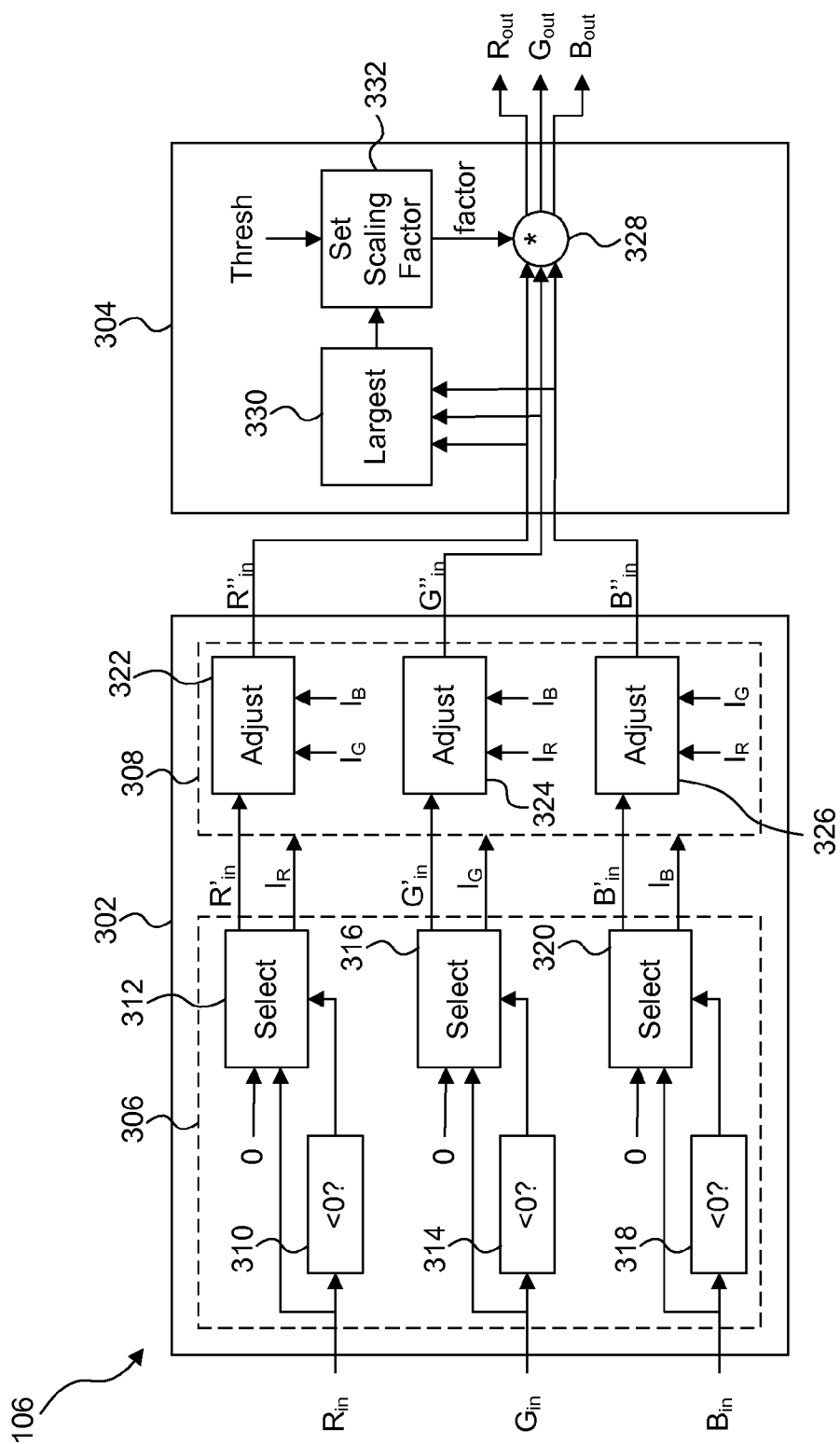
FIG. 3 is a schematic diagram of a gamut mapping unit.

In the extended RGB format described herein, components are allowed to take negative values, e.g. down to as low as −0.5 which can allow colours which are too saturated to be represented in the unextended RGB format to be represented. For example, in the xvYCC extended gamut, a negative component represents increased saturation for the complementary colour. For example, the most saturated cyan colour that a pixel can have in the unextended RGB format has Blue and Green components with values of one and a Red component with a value of zero. An even more saturated cyan colour can be represented in the extended RGB format by decreasing the red component such that it has a negative value. As an example, FIG. 2b is a 2D representation of the colour of a pixel determined from the component values of the pixel in a second example in which the red component is negative. As in FIG. 2a, the directions of positive red, positive green and positive blue are indicated in FIG. 2b by "+R", "+G" and "+B", and the circle 202 has a radius of magnitude one. The blue and green components of the pixel (represented by the arrows 204 and 206) are the same as those of the pixel shown in FIG. 2a, but the red component is negative as represented by the arrow denoted 212. The resultant colour of the pixel is represented with the vector 214, and is a highly saturated bluish cyan colour. It is noted that the vector 214 represents a more saturated colour than can be represented using the unextended RGB format in which the component values are constrained to be within the range from 0 to 1. It is therefore apparent that the extended RGB format is useful for representing very saturated colours, but for some purposes (e.g. for displaying an image) the component values will need to be converted into a different format (e.g. sRGB), and this conversion is implemented by the gamut mapping unit 106 as described in more detail below. FIG. 3 shows a schematic diagram of the gamut mapping unit 106. The gamut mapping unit 106 may be implemented in hardware or software or a combination thereof. The gamut mapping unit 106 comprises an adjusting module 302 and a mapping module 304. The adjusting module 302 comprises a first adjustment block 306 and a second adjustment block 308. The first adjustment block 306 comprises a first comparator 310, first selection logic 312, a second comparator 314, second selection logic 316, a third comparator 318, and third selection logic 320. The second adjustment block 308 comprises a first adjusting unit 322, a second adjusting unit 324 and a third adjusting unit 326. The mapping module 304 comprises a multiplier 328, a first determining unit 330 and a second determining unit 332. The gamut mapping unit 106 is configured to receive input component values denoted $R_{in}$, $G_{in}$ and $B_{in}$ for the three colour channels: Red, Green and Blue; and to provide output component values $R_{out}$, $G_{out}$ and $B_{out}$ which are the result of a gamut mapping process. In particular, the adjusting module 302 is arranged to receive the input component values $R_{in}$, $G_{in}$ and $B_{in}$ and to provide adjusted input component values $R''_{in}$, $G''_{in}$ and $B''_{in}$ to the mapping module 304. The adjusting module 302 operates such that the adjusted input component values $R''_{in}$, $G''_{in}$ and $B''_{in}$ do not include negative values. The mapping module 304 operates to apply mapping (e.g. including scaling) to the adjusted input component values $R''_{in}$, $G''_{in}$ and $B''_{in}$ to provide the output component values $R_{out}$, $G_{out}$ and $B_{out}$.

In particular, the comparator 310 and the selection logic 312 are arranged to receive the input component value $R_{in}$. The selection logic 312 is also arranged to receive a value of zero. An output of the comparator 310 is coupled to an input of the selection logic 312. A first output of the selection logic 312 is coupled to a first input of the adjusting unit 322. The comparator 314 and the selection logic 316 are arranged to receive the input component value $G_{in}$. The selection logic 316 is also arranged to receive a value of zero. An output of the comparator 314 is coupled to an input of the selection logic 316. A first output of the selection logic 316 is coupled to a first input of the adjusting unit 324. The comparator 318 and the selection logic 320 are arranged to receive the input component value $B_{in}$. The selection logic 320 is also arranged to receive a value of zero. An output of the comparator 318 is coupled to an input of the selection logic 320. A first output of the selection logic 320 is coupled to a first input of the adjusting unit 326. A second output of the selection logic 312 is coupled to a second input of the adjusting unit 324 and to a second input of the adjusting unit 326. A second output of the selection logic 316 is coupled to a second input of the adjusting unit 322 and to a third input of the adjusting unit 326. A second output of the selection logic 320 is coupled to a third input of the adjusting unit 322 and to a third input of the adjusting unit 324. An output of the adjusting unit 322 is the adjusted input component value $R''_{in}$ and is coupled to a first input of the determining unit 330 and to a first input of the multiplier 328. An output of the adjusting unit 324 is the adjusted input component value $G''_{in}$ and is coupled to a second input of the determining unit 330 and to a second input of the multiplier 328. An output of the adjusting unit 326 is the adjusted input component value $B''_{in}$ and is coupled to a third input of the determining unit 330 and to a third input of the multiplier 328. An output of the determining unit 330 is coupled to a first input of the determining unit 332. The determining unit 332 is arranged to receive a threshold value at a second input. An output of the determining unit 332 is coupled to a fourth input of the multiplier 328. The multiplier 328 has three outputs arranged to provide the three output component values $R_{out}$, $G_{out}$ and $B_{out}$ as the outputs of the gamut mapping unit 106.

Figure 4:
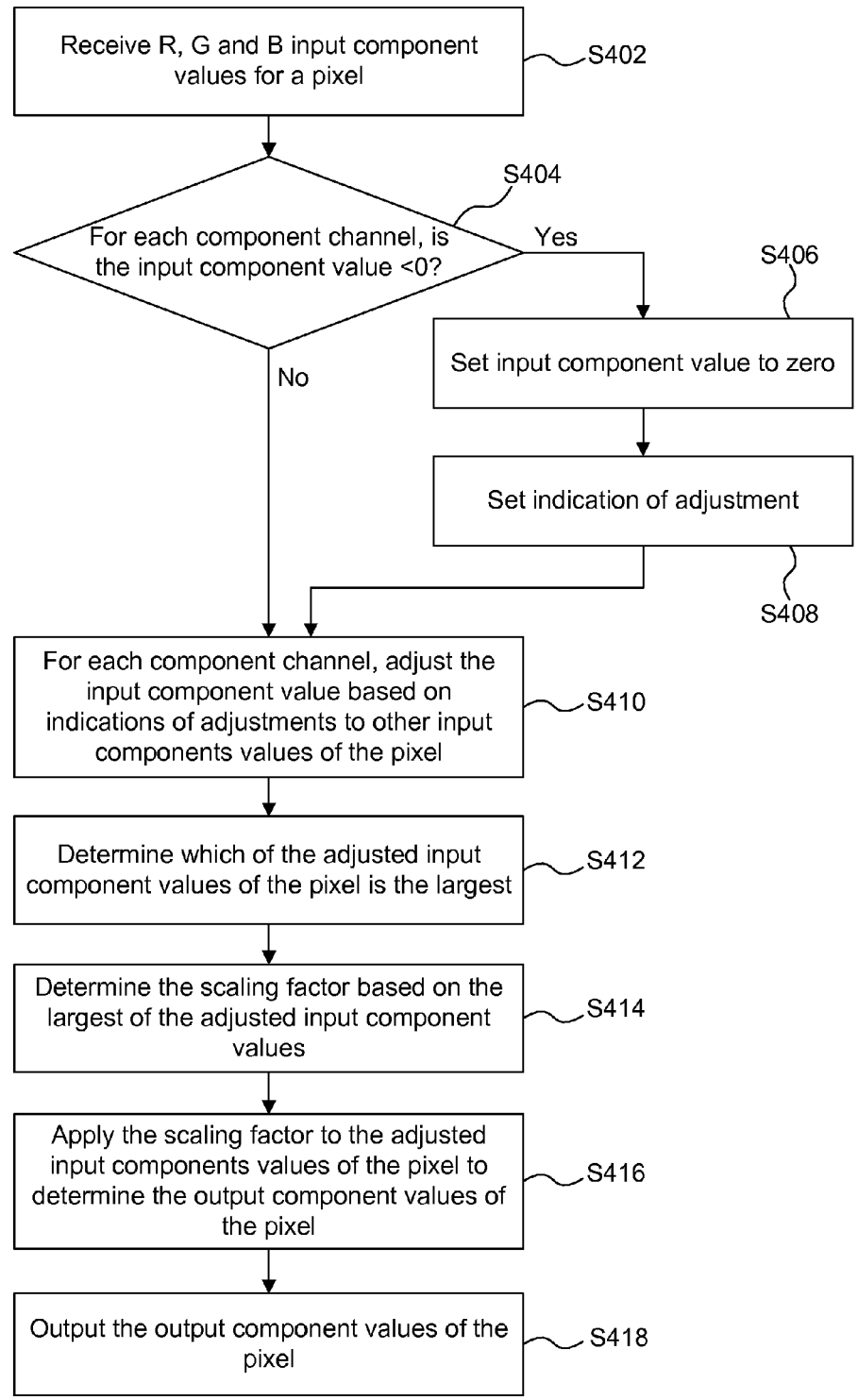
FIG. 4 is a flow chart for a method of applying gamut mapping to a pixel.

The operation of the gamut mapping unit 106 is described with reference to the flow chart shown in FIG. 4. In step S402 the input component values $R_{in}$, $G_{in}$ and $B_{in}$ of a pixel are received at the first adjustment block 306 of the adjusting module 302 of the gamut mapping unit 106. As described above, in the examples described in detail herein, $R_{in}$, $G_{in}$ and $B_{in}$ are in an extended RGB format where the valid range may extend below 0.0 and/or above 1.0. One example of an extended RGB format is xvYCC, which has a valid range of −0.5 to 1.5 for each of the R, G and B values. As mentioned above, scaling will not convert a negative component value to provide a non-negative value, so the adjusting module 302 adjusts the input component values to remove the negative values before the mapping module 304 scales the adjusted input component values.

In step S404, each of the comparators 310, 314 and 318 determines whether the respective one of $R_{in}$, $G_{in}$ and $B_{in}$ is negative. The result of each determination is provided to the corresponding selection logic 312, 316 or 320. It is noted that in some situations two, or possibly even all three, of the input component values ($R_{in}$, $G_{in}$ and $B_{in}$) of a pixel may be negative, and the operation of the gamut mapping unit 106 as described herein will handle these situations.

If for example, $R_{in}$ is negative then the comparator 310 passes a signal to the selection logic 312 to indicate that $R_{in}$ is negative. The selection logic 312 also receives the value of $R_{in}$ and a value of zero. In step S406, if $R_{in}$ is negative then the selection logic 312 outputs the value of zero as the output $R'_{in}$ which represents an initial adjustment of the input component $R_{in}$. In other examples, the selection logic 312 does not actually receive a value of zero, and instead it may internally generate a value of zero to be outputted if $R_{in}$ is negative. That is, the selection logic 312 operates to output a value of zero if $R_{in}$ is negative, irrespective of how the selection logic 312 receives or generates the zero value.

In step S408 the selection logic 312 outputs an indication of the adjustment ("$I_R$") that has been made to the input component $R_{in}$. The value of the indication, $I_R$, may for example equal the input value of $R_{in}$ or may equal the magnitude of the input value $R_{in}$ (since it is noted that in this case $R_{in}$ is negative), or any other value that provides an indication of the adjustment that has been made to the input component value $R_{in}$ to adjust it from $R_{in}$ to $R'_{in}$, where in the example given above $R'_{in}$=0. If the input component value $R_{in}$ is not negative then the selection logic 312 outputs the value of $R_{in}$, unchanged, on the output denoted $R'_{in}$, and the indication, $I_R$, takes a value of zero because no adjustment has been made to the input value $R_{in}$. This is represented in the flow chart in that steps S406 and S408 are bypassed if the input component value $R_{in}$ is not negative.

Steps S404 to S408 are described above in relation to the red component values, but as will be apparent these steps are performed for each of the component values, i.e. for the green and blue component values as well as for the red component values. The comparator 314 and selection logic 316 perform steps S404 to S408 for the green input component value $G_{in}$ to provide the initial adjustment $G'_{in}$ of the input component $G_{in}$ and the indication $I_G$ of the adjustment made to the input value $G_{in}$. Similarly, the comparator 318 and selection logic 320 perform steps S404 to S408 for the blue input component value $B_{in}$ to provide the initial adjustment $B'_{in}$ of the input component $B_{in}$ and the indication $I_B$ of the adjustment made to the input component value $B_{in}$.

Therefore, in summary if $R_{in} \geq 0$ then $R'_{in}=R_{in}$ and $I_R$ indicates that $R_{in}$ has not been adjusted (e.g. $I_R=0$). However, if $R_{in}<0$ then $R'_{in}=0$ and $I_R$ indicates that $R_{in}$ has been adjusted by the magnitude of $R_{in}$ (e.g. $I_R=R_{in}$). Similarly, if $G_{in} \geq 0$ then $G'_{in}=G_{in}$ and $I_G$ indicates that $G_{in}$ has not been adjusted (e.g. $I_G=0$). However, if $G_{in}<0$ then $G'_{in}=0$ and $I_G$ indicates that $G_{in}$ has been adjusted by the magnitude of $G_{in}$ (e.g. $I_G=G_{in}$). Similarly, if $B_{in} \geq 0$ then $B'_{in}=B_{in}$ and $I_B$ indicates that $B_{in}$ has not been adjusted (e.g. $I_B=0$). However, if $B_{in}<0$ then $B'_{in}=0$ and $I_B$ indicates that $B_{in}$ has been adjusted by the magnitude of $B_{in}$ (e.g. $I_B=B_{in}$). It can therefore be appreciated that the initially adjusted values $R'_{in}$, $G'_{in}$ and $B'_{in}$ are not negative even if any of the corresponding input component values $R_{in}$, $G_{in}$ or $B_{in}$ are negative.

However, as shown in FIG. 2b a negative component value represents an increased saturation of the complementary colour. Therefore, by setting any negative input component values of a pixel to zero, the saturation of the resultant pixel colour is reduced. This undesired effect can be reduced by adjusting the other component values of the pixel to thereby compensate for the adjustment to the initially negative input component value. Therefore, in step S410 the adjusting units 322 to 326 of the second adjustment block 308 adjust the respective component values $R'_{in}$, $G'_{in}$ and $B'_{in}$ based on the indications $I_R$, $I_G$ and $I_B$ to determine the adjusted input component values $R''_{in}$, $G''_{in}$ and $B''_{in}$.

For example, the adjusting unit 324 receives the initially adjusted input Green value $G'_{in}$ and the indications $I_R$ and $I_B$ which indicate any adjustments made to the input component values $R_{in}$ and $B_{in}$ by the first adjustment block 306.

For example, let us assume that both $G_{in}$ and $B_{in}$ are positive but $R_{in}$ is negative as in the example shown in FIG. 2b. In that case, $G'_{in}=G_{in}$ and $I_B$ indicates that the Blue input component value $B_{in}$ was not adjusted in the first adjustment block 306. However, the Red input component $R_{in}$ was adjusted to be zero in the first adjustment block 306 and that adjustment is indicated by $I_R$. The adjusting unit 324 adjusts the Green input component value based on the previous adjustment to the Red input component value to determine the adjusted input component value $G''_{in}$. For example, the magnitude of the Green input component value is increased by an amount based on the magnitude of the adjustment to the Red input component value, i.e. $|R_{in}|$. As an example, the magnitude of the Green input component value is increased by $\alpha|R_{in}|$, where $\alpha$ is a coefficient which may be set (e.g. by firmware) and stored in a store wherein the adjusting unit 324 can retrieve the value of $\alpha$ from the store for use in adjusting the Green input component value. As an example, $\alpha=1$.

In the same way as described above for the Green input component value, the adjusting unit 326 adjusts the Blue input component value based on the previous adjustment to the Red input component value to determine the adjusted input component value $B''_{in}$. As an example the magnitude of the Blue input component value may be increased by $\alpha|R_{in}|$, where $\alpha$ may equal 1. In this example, the magnitude of the Blue and Green input component values are increased by an amount such that the 2D vector sum (e.g. as shown in the diagrams in FIG. 2a or FIG. 2b) of the input component values ($R_{in}$, $G_{in}$ and $B_{in}$) matches (i.e. is the same as) the 2D vector sum of the adjusted input component values ($R''_{in}$, $G''_{in}$ and $B''_{in}$), that is:

$$R_{in}+G_{in}+B_{in}=R''_{in}+G''_{in}+B''_{in}.$$

In this way, the magnitudes of negative input component values can be transferred to the component values representing the complementary colour to thereby compensate for a change in saturation caused by setting the initially negative input component value to a non-negative value (e.g. zero).

If more than one of the input component values are negative, e.g. if both $R_{in}$ and $G_{in}$ are negative, then both $R'_{in}$ and $G'_{in}$ are set to zero and $I_R = R_{in}$ and $I_G = G_{in}$. Therefore the adjusted input component values, $R''_{in}$ and $G''_{in}$, are both greater than zero, (e.g. $G''_{in} = \alpha|R_{in}|$, and $R''_{in} = \alpha|R_{in}|$), even though both $R_{in}$ and $G_{in}$ were negative. The adjusted input blue component, $B''_{in}$, is increased by an amount given by $\alpha|R_{in}| + \alpha|R_{in}|$.

In the example described above, $\alpha=1$. In other examples, $\alpha$ may take other values. $\alpha$ is a parameter which may be tuned to adjust the amount of correction applied by the gamut mapping unit 106. For example, $\alpha$ may be set to be in the range $0 \leq \alpha \leq 2$. As another example, $\alpha$ may be set to be in the range $0.5 \leq \alpha \leq 1.25$. It has been found that setting $\alpha=0.5$ results in a good performance of the gamut mapping unit 106.

In the examples given above, when one of the input component values (e.g. $R_n$) is negative then all of the other input component values (e.g. $G_{in}$ and $B_{in}$) of the pixel are increased by the same amount (e.g. $|R_{in}|$). However, in other examples, the other input colour values (e.g. $G_{in}$ and $B_{in}$) may be adjusted differently to each other, and it may be the case that only some (i.e. not all) of the other input colour values are adjusted in the second adjustment block 308. That is, the value of $\alpha$ set to be different for different transfers from each component to another component. That is, a value $\alpha_{RG}$ may be used for the transfer of a negative red component to the green component, i.e. if $R_{in}<0$ then $G''_{in}$ is increased by an amount given by $\alpha_{RG}|R_{in}|$. Similarly, a value $\alpha_{RB}$ may be used for the transfer of a negative red component to the blue component, i.e. if $R_{in}<0$ then $B''_{in}$ is increased by an amount given by $\alpha_{RB}|R_{in}|$. Similarly, a value $\alpha_{GR}$ may be used for the transfer of a negative green component to the red component, i.e. if $G_{in}<0$ then $R''_{in}$ is increased by an amount given by $\alpha_{GR}|G_{in}|$. Similarly, a value $\alpha_{GB}$ may be used for the transfer of a negative green component to the blue component, i.e. if $G_{in}<0$ then $B''_{in}$ is increased by an amount given by $\alpha_{GB}|G_{in}|$. Similarly, a value $\alpha_{BR}$ may be used for the transfer of a negative blue component to the red component, i.e. if $B_{in}<0$ then $R''_{in}$ is increased by an amount given by $\alpha_{BR}|B_{in}|$. Similarly, a value $\alpha_{BG}$ may be used for the transfer of a negative blue component to the green component, i.e. if $B_{in}<0$ then $G''_{in}$ is increased by an amount given by $\alpha_{BG}|B_{in}|$. The values of $\alpha_{RG}$, $\alpha_{RB}$, $\alpha_{GR}$, $\alpha_{GB}$, $\alpha_{BR}$, and $\alpha_{BG}$ may be tuned independently, and may be different or all equal to each other depending on the implementation of the gamut mapping unit 106.

It can be appreciated that, in step S410, the magnitude of the adjustment made to an initially negative input component value (e.g. $R_{in}$) of the pixel is transferred to the other component values (e.g. $G_{in}$ and $B_{in}$) of the pixel with the aim of reducing the effect on the saturation of the pixel colour caused by the adjustment of the initially negative input component value. In this sense, the other component values are adjusted to compensate for the adjustment applied to the initially negative input component value.

The adjustment to the input component values to remove negative values is implemented in a simple manner in the example described above. That is, all of the processes can be implemented with simple operations such as comparison operations, selection operations, multiplication operations and addition operations. This allows the adjustment of the input component values to be applied to pixel data in real-time without consuming high levels of processing resources in the camera processing pipeline 104 as the pixel data is received from the image sensor 102. This is useful because the camera processing pipeline 104 receives pixel data at a very high data rate (e.g. pixel data for tens or hundreds of millions of pixels per second when the image sensor 102 is capturing multiple frames per second with each frame comprising many millions of pixels) and aims to display the images received from the image sensor 102 on a display in real-time, e.g. without a delay that is perceptible to a user. Furthermore, the constraints of processing power on the camera processing pipeline 104 may be relatively severe because the camera processing pipeline 104 may be implemented in a handheld device such as a handheld camera which does not include large processors for reasons of cost, space, weight, power saving and/or heat production, etc.

The adjusted input component values $R''_{in}$, $G''_{in}$ and $B''_{in}$ are passed to the mapping module 304 which determines the output component values $R_{out}$, $G_{out}$ and $B_{out}$ by mapping the adjusted input component values $R''_{in}$, $G''_{in}$ and $B''_{in}$ into the valid component value range of the output gamut. For example, the valid component value range for the unextended sRGB format is from 0 to 1. In order to do this the mapping module 304 is configured to scale the adjusted input component values $R''_{in}$, $G''_{in}$ and $B''_{in}$ of the pixel using a scaling factor to thereby determine the output component values $R_{out}$, $G_{out}$ and $B_{out}$ of the pixel.

The mapping process implemented by the mapping module 304 preserves a core gamut in which none of the adjusted input component values of a pixel are in the proximity of the upper boundary of the output valid component value range. For pixels whose adjusted input component values lie within the core gamut, the adjusted input component values are not substantially changed by the mapping module 304. However, for pixels which have an adjusted input component value that is outside of, or in the proximity of the upper boundary of, the output valid range, the adjusted input component values are scaled such that the output component values lie within the valid output component range. The mapping process is monotonic such that the adjusted input component values representing the most saturated colours are mapped to output component values representing the most saturated colours.

In step S412 the determining unit 330 determines which of the adjusted input component values $R''_{in}$, $G''_{in}$ and $B''_{in}$ of the pixel is the largest. It is the largest of the adjusted input component values that will determine the scaling factor to be used for scaling the adjusted input component values.

In step S414 the determining unit 332 determines a scaling factor, f, based on the largest of the adjusted input component values of the pixel. The scaling factor is determined so as to map the adjusted input component values to the output component values in such a way as to preserve a core gamut whilst still ensuring that the output component values are within the valid range, e.g. from 0 to 1. The determination of the scaling factor is described in more detail below with reference to FIGS. 5 and 6.

The scaling factor, f, is passed to the multiplier 328, and in step S416 the multiplier applies the scaling factor to each of the adjusted input component values of the pixel to determine the output component values of the pixel. That is:

$R_{out} = f \times R''_{in}$ $G_{out} = f \times G''_{in}$ $B_{out} = f \times B''_{in}$.

The same scaling factor, f, is used for each of the component values of a pixel such that the ratio between the different component values of the pixel is not changed by the mapping module 304. In this way, the hue of the pixel is preserved by maintaining the component ratios.

In step S418 the multiplier 328 outputs the output component values ($R_{out}$, $G_{out}$ and $B_{out}$) of the pixel thereby providing the output of the gamut mapping unit 106. The output component values ($R_{out}$, $G_{out}$ and $B_{out}$) of the pixel are within the valid output range, e.g. 0 to 1. The output component values may be output for any suitable use, e.g. for display on a display, for storage in a store or for further processing in the camera processing pipeline 104.

Figure 5:
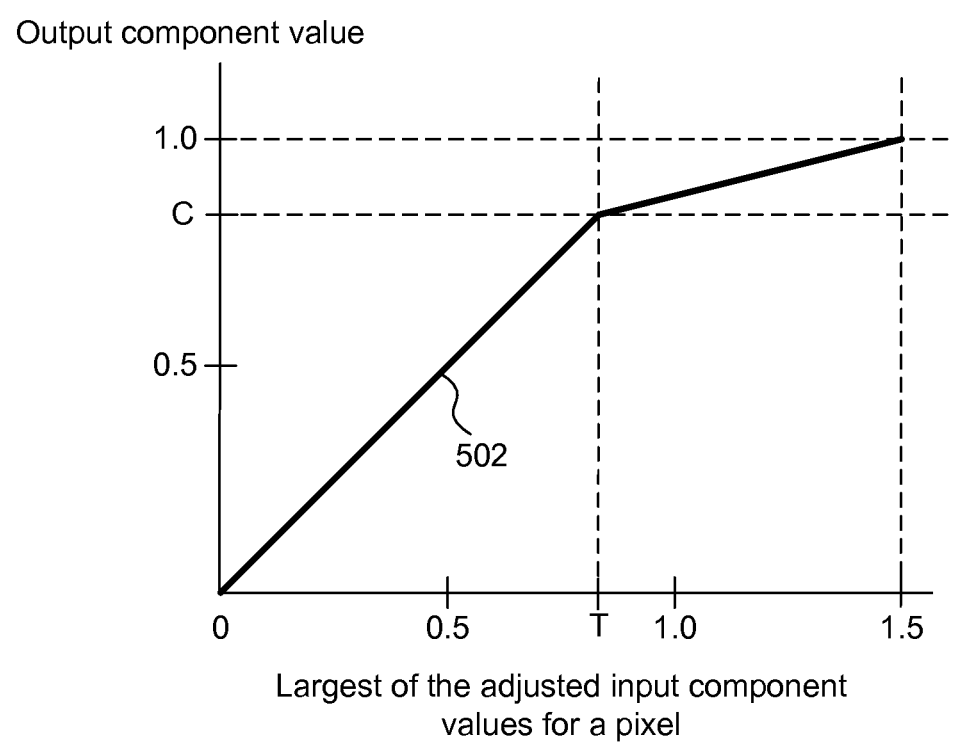
FIG. 5 is a graph showing an example of the output component value as a function of the largest of the adjusted input component values of a pixel.

Returning to step S414 the determination of the scaling factor is explained in more detail with reference to FIGS. 5 and 6. FIG. 5 is a graph showing an example of the output component value represented with the line 502 for the largest of the adjusted input component values of a pixel. Following the adjustment to the input component values performed by the adjusting module 302, none of the adjusted input component values $R''_{in}$, $G''_{in}$ and $B''_{in}$ are negative. However, due to the compensation for negative input component values, it is possible that one or more of the other adjusted input component values are greater than 1.5 (i.e. greater than the maximum of the allowed range. Therefore, in some examples, the adjusted input component values may be clipped to ensure that they are within the range from 0 to 1.5. The mapping operation performed by the mapping module 304 implements a simple two-slope scaling, as shown by the two slopes in FIG. 5. The determining unit 332 receives a threshold value, which may be stored in a store (e.g. a register) and may be set, for example, by firmware. The threshold value represents the upper limit to the "core" of the adjusted input component values, and is represented in FIG. 5 as "T". The upper boundary to the corresponding core of the output component values is shown in FIG. 5 as "C". The threshold value represents the "knee point" of the graph shown in FIG. 5.

As an example, the threshold value may be 0.9 or 0.8 or some other suitable value which is preferably below 1. Below the threshold value (i.e. within the "core" gamut), the gradient of the line 502 is approximately equal to one. In this way, if the largest of the adjusted input component values is less than the threshold value then the output component values are approximately equal to the corresponding adjusted input component values. However, above the threshold value (i.e. outside of the "core" gamut), the gradient of the line 502 is less than one. In this way, if the largest of the adjusted input component values is greater than the threshold value then the adjusted input component values of the pixel are scaled such that all of the output component values of the pixel lie within the valid output range of component values, e.g. between 0 and 1.

The scaling factor is determined such that when the largest of the adjusted input component values of a pixel is multiplied by the scaling factor the output component values have the values shown in FIG. 5. The largest of the input component values is used to lookup the scaling factor which is applied to all three adjusted input component values. FIG. 6 is a graph showing an example of the scaling factor (represented by the line 602) as a function of the largest adjusted input component value of a pixel. FIG. 6 shows a two segment gain curve. As shown in FIG. 6, if the largest of the adjusted input component values of the pixel is less than the threshold value, T, then the scaling factor, f, is determined to be substantially equal to one. It will be apparent to a person skilled in the art that the scaling factor, f, could be slightly different from 1 but would still be considered as being "substantially equal to one" if the scaling of the adjusted input component values of the pixel by the scaling factor to determine the output component values of the pixel does not perceptibly alter the appearance of the pixel.

Figure 6:
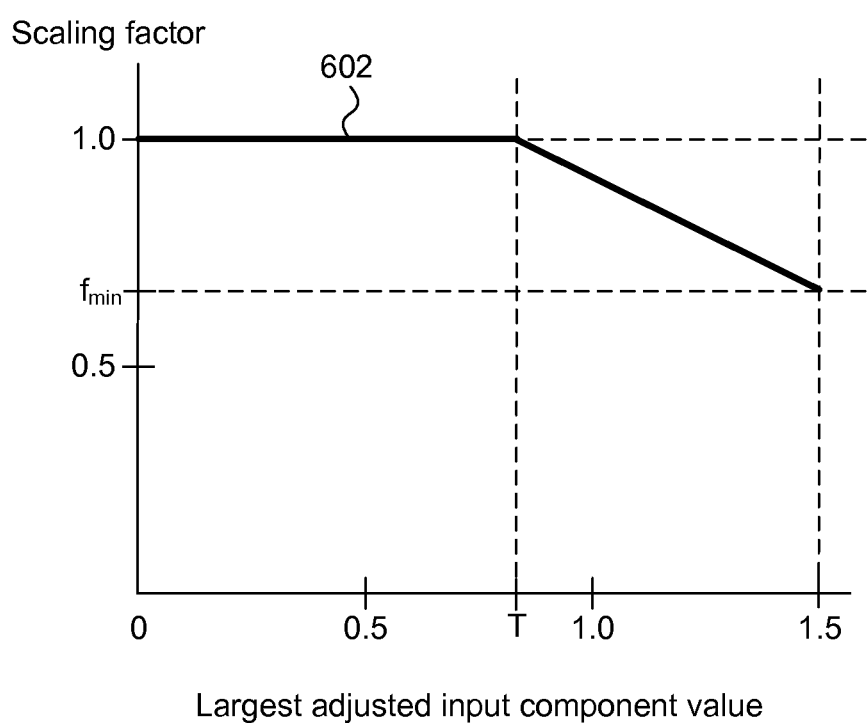
FIG. 6 is a graph showing an example of the scaling factor as a function of the largest adjusted input component value of a pixel.

It can be seen in FIG. 6 that if the largest of the adjusted input component values of the pixel is greater than the threshold value, T, then the scaling factor, f, is determined to be less than one, such that the output component values are less than the corresponding adjusted input component values. In the example shown in FIG. 6, the scaling factor, f, is determined based on the difference between the largest of the adjusted input component values (L) of the pixel and the threshold value (T), such that a larger difference (L-T) results in a smaller scaling factor (f) being determined. When L>T, the scaling factor, f, may be given by:

$$f = \frac{C}{T} - \frac{dest - C}{\max - T}(L - T)$$

where dest is the maximum value that the output component values can take (e.g. dest=1 in the example shown in FIG. 6), and max is the maximum value that the adjusted input component values can take (e.g. max=1.5 in the example shown in FIG. 6). In the example shown in FIG. 6, C=T, such that the scaling factor is given, in this example, by:

$$f = 1 - \frac{1-t}{1.5-t}(L-T)$$

It is noted that for L<T, the scaling factor is given, in the example shown in FIG. 6 simply as:

$$f = \frac{C}{T} = 1$$

The values of the coefficients dest, max, T and C may be set (e.g. by firmware) and stored (e.g. in registers) for use by the determining unit 332 in determining the scaling factor. In other examples, the thresholds and slopes may be stored rather than storing the coefficients, e.g. the slope value $$\left(\frac{1-t}{1.5-t}\right)$$

may be precomputed and stored. The values of the coefficients may be fixed or may be adjustable such that the coefficients can be adjusted to suit particular pixel data that is arriving at the gamut mapping unit 106. In particular, by controlling the values of the coefficients, a programmable blend between scaling and clipping can be achieved which preserves the core gamut without introducing clipping artefacts at the upper boundary of the output gamut.

FIG. 6 shows a two segment gain curve represented by the scaling factor. In other examples there could be three or more segments in the curve which represents the scaling factor. This would allow greater flexibility in the way in which the extended range of adjusted input component values (e.g. from 0 to 1.5) is mapped into the unextended range of the output component values (e.g. from 0 to 1). Furthermore, the number of segments in the curve could be variable and could be set by the firmware. With more segments a curved mapping function can be approximated more accurately, but the complexity of the solution increases. So there is a trade-off between accuracy and complexity which can be chosen to suit particular implementations. In an extreme example, there may be a lookup table with a scaling factor for every possible input component value. For example, this could be used to approximate a mapping function with a logarithmic shape.

It can therefore be appreciated that the examples described herein provide a simple way to convert input component values having an extended range (e.g. from −0.5 to 1.5) into output component values having an unextended range (e.g. from 0 to 1), which does not need large amounts of processing power and/or time to implement. This allows the gamut mapping unit 106 of the examples described herein to be implemented in a camera processing pipeline 104 which processes pixel data in real-time that is received from the image sensor 102, e.g. for display in real-time as the pixel data is captured. Furthermore, the image sensor 102 and camera processing pipeline 104 can be implemented in a device, such as a handheld camera, smartphone, tablet or other user device which has strict constraints on the amount of processing power that can be used to process the pixel data. Therefore, the methods described herein may have benefits compared to other methods which implement more complex operations in order to apply gamut mapping to pixel data. In particular, the methods described herein avoid the processing power and time associated with performing colour space conversions and/or non-linear functions on the pixel data in order to apply gamut mapping to the pixel data.

The methods described herein are particularly suited for gamut mapping between gamuts which are relatively similar to each other. For example the methods described herein are better for applying gamut mapping to pixels with components in an image sensor gamut (e.g. in an extended RGB format such as xvYCC) to convert them into pixels with components in a display gamut (e.g. in an unextended RGB format such as sRGB) than for applying gamut mapping involving large changes to the component values, e.g. to map pixels scanned from a photographic slide into pixels for a printed page. The methods described herein are well suited for methods involving small changes to the gamut of the pixels because the methods are very simple to implement, and it is noted that any inaccuracies in the gamut mapping tend not to be perceptually detrimental when small gamut changes are implemented using the methods described herein. For example, any inaccuracies in the gamut mapping of the examples described herein tend not to be perceptually detrimental for converting RGB values in an extended RGB format (e.g. xvYCC format) into RGB values in an unextended RGB format (e.g. sRGB format), and the low complexity of the methods described herein makes them very well suited for performing these gamut mapping operations in real-time, e.g. in the camera processing pipeline 104. Some simple gamut mapping operations would introduce clipping artefacts, but these are avoided in the methods described herein because the gamut mapping provides some scaling of the component values for component values that are outside of the "core" gamut. This is achieved whilst preserving the component values within the core gamut as described above.

In the example shown in FIG. 3 the adjusted input component values $R''_{in}$, $G''_{in}$ and $B''_{in}$ are passed to the mapping module 304 which determines the output component values $R_{out}$, $G_{out}$ and $B_{out}$ based on $R''_{in}$, $G''_{in}$ and $B''_{in}$. In other examples, the output component values $R_{out}$, $G_{out}$ and $B_{out}$ are set to be the adjusted input component values $R''_{in}$, $G''_{in}$ and $B''_{in}$. This may be the case if none of the adjusted input component values $R''_{in}$, $G''_{in}$ and $B''_{in}$ exceed the maximum value of the output gamut, e.g. if they don't exceed a value of 1. In these examples, the mapping module 304 might not be implemented in the gamut mapping unit 106.

In examples described above the extended RGB values are in the xvYCC format and have values in the range from −0.5 to 1.5 and the unextended RGB values are in the sRGB format and have values in the range from 0 to 1. These formats and ranges are just given by way of example, and in other examples different formats and/or ranges may be used.

Generally, any of the functions, methods, techniques or components described above can be implemented in modules using software, firmware, hardware (e.g., fixed logic circuitry), or any combination of these implementations. The terms "module," "functionality,", "block", "unit" and "logic" are used herein to generally represent software, firmware, hardware, or any combination thereof.

In the case of a software implementation, the module, functionality, unit, block or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, unit, block or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, block, unit or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, block, unit or logic described above, such as HDL (hardware description language) software, as is used for designing integrated circuits, or for configuring programmable chips, to carry out desired functions. That is, there may be provided a computer readable storage medium having encoded thereon computer readable program code for generating a gamut mapping unit configured to perform any of the methods described herein, or for generating a gamut mapping unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a gamut mapping unit as described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of converting a plurality of input component values of a pixel to a corresponding plurality of output component values of the pixel, wherein the input component values are in a first format which has a first valid component value range which includes some negative values and wherein the output component values are in a second format which has a second valid component value range which does not include negative values, wherein the method comprises:
receiving a plurality of input component values of a pixel of an image captured by an image sensor;
for each of the input component values of the pixel: determining whether the input component value of the pixel is negative, and if it is determined that the input component value is negative applying an initial adjustment to the input component value such that the adjusted input component value is not negative; and
for each of the input component values of the pixel: if an initial adjustment has been applied to one or more of the other input component values of the pixel, adjusting the input component value of the pixel based on: (i) the one or more initial adjustments applied to said one or more of the other input component values, and (ii) one or more parameters which set the amounts of the respective one or more initial adjustments which are to be transferred from said one or more of the other input component values to said input component value, to thereby compensate for the initial adjustment applied to said one or more of the other input component values, wherein respective parameters set the amounts of initial adjustments which are to be transferred for different transfers from one input component value to another input component value, and
using the adjusted input component values to set output component values;
whereby the output component values of the pixel are based on the adjusted input component values of the pixel.

2. The method of claim 1 wherein the parameters are tunable.

3. The method of claim 2 wherein the parameters are independently tunable.

4. The method of claim 1 wherein the parameters are not all the same as each other.

5. The method of claim 1 wherein the plurality of input component values of the pixel comprises Red, Green and Blue (RGB) component values, and wherein the first format is an extended RGB format and the second format is an unextended RGB format.

6. The method of claim 5 wherein the first valid component value range is from −0.5 to 1.5 and the second valid component value range is from 0 to 1.

7. The method of claim 1 further comprising setting the output component values of the pixel to be the adjusted input component values of the pixel.

8. A gamut mapping unit configured to convert a plurality of input component values of a pixel of an image captured by an image sensor to a corresponding plurality of output component values of the pixel, wherein the input component values are in a first format which has a first valid component value range which includes some negative values and wherein the output component values are in a second format which has a second valid component value range which does not include negative values, wherein the gamut mapping unit comprises:
an adjusting module, including
a first adjustment block configured to, for each of the input component values of the pixel,
determine whether the input component value of the pixel is negative, and
if it is determined that the input component value is negative, apply an initial adjustment to the input component value such that the adjusted input component value is not negative; and
a second adjustment block configured to for each of the input component values of the pixel, if an initial adjustment has been applied to one or more of the other input component values of the pixel, adjust the input component value of the pixel based on: (i) the one or more initial adjustments applied to said one or more of the other input component values, and (ii) one or more parameters which set the amounts of the respective one or more initial adjustments which are to be transferred from said one or more of the other input component values to said input component value, to thereby compensate for the initial adjustment applied to said one or more of the other input component values, wherein respective parameters set the amounts of initial adjustments which are to be transferred for different transfers from one input component value to another input component value; and an output module configured to set output component values using adjusted input component values from said adjusting module and to output the output component values of the pixel, whereby the output component values of the pixel are based on the adjusted input component values of the pixel.

9. The gamut mapping unit of claim 8 wherein the parameters are independently tunable.

10. The gamut mapping unit of claim 8 wherein each of the parameters is within a range from 0 to 2, or wherein each of the parameters is within a range from 0.5 to 1.25.

11. The gamut mapping unit of claim 8 further comprising a store configured to store the parameters.

12. The gamut mapping unit of claim 8 wherein the second adjustment block is configured to increase the magnitude of the input component value by an amount based on the magnitude of the one or more initial adjustments applied to said one or more of the other input component values.

13. The gamut mapping unit of claim 12 wherein the second adjustment block is configured to increase the magnitude of the input component value by an amount such that the 2D vector sum of the plurality of input component values of the pixel matches the 2D vector sum of the corresponding plurality of adjusted input component values of the pixel.

14. The gamut mapping unit of claim 8, wherein the output module further comprising comprises a mapping module configured to determine the output component values by mapping the adjusted input component values into the second valid component value range.

15. The gamut mapping unit of claim 14 wherein the mapping module is configured to scale the plurality of adjusted input component values of the pixel using a scaling factor to thereby determine the plurality of output component values of the pixel.

16. The gamut mapping unit of claim 15 wherein the mapping module comprises:

a first determining unit configured to determine which of the adjusted input component values of the pixel is the largest; and a second determining unit configured to determine the scaling factor based on the largest of the adjusted input component values of the pixel.

17. The gamut mapping unit of claim 16, wherein the second determining unit is configured to:

determine the scaling factor to be substantially equal to one if the largest of the adjusted input component values of the pixel is less than a threshold value, such that scaling of the adjusted input component values of the pixel to determine the output component values of the pixel does not perceptually alter the appearance of the pixel, and determine the scaling factor to be less than one if the largest of the adjusted input component values of the pixel is greater than the threshold value, such that the output component values are less than the corresponding adjusted input component values.

18. The gamut mapping unit of claim 17 wherein the second determining unit is configured to, if the largest of the adjusted input component values of the pixel is greater than the threshold value, determine the scaling factor based on the difference between the largest of the adjusted input component values of the pixel and the threshold value, such that a larger difference results in a smaller scaling factor being determined.

19. A non-transitory computer readable storage medium having stored thereon processor executable instructions that when executed cause at least one processor to convert a plurality of input component values of a pixel of an image captured by an image sensor to a corresponding plurality of output component values of the pixel, wherein the input component values are in a first format which has a first valid component value range which includes some negative values and wherein the output component values are in a second format which has a second valid component value range which does not include negative values, the processor executable instructions comprising instructions causing at least one processor to:

for each of the input component values of the pixel: determine whether the input component value of the pixel is negative, and if it is determined that the input component value is negative applying an initial adjustment to the input component value such that the adjusted input component value is not negative; and for each of the input component values of the pixel: if an initial adjustment has been applied to one or more of the other input component values of the pixel, adjust the input component value of the pixel based on: (i) the one or more initial adjustments applied to said one or more of the other input component values, and (ii) one or more parameters which set the amounts of the respective one or more initial adjustments which are to be transferred from said one or more of the other input component values to said input component value, to thereby compensate for the initial adjustment applied to said one or more of the other input component values, wherein respective parameters set the amounts of initial adjustments which are to be transferred for different transfers from one input component value to another input component value, wherein the output component values of the pixel are based on the adjusted input component values of the pixel.

20. A non-transitory computer readable storage medium having stored thereon processor executable instructions that when executed at a computer system for generating a representation of a digital circuit from definitions of circuit elements and data defining rules for combining those circuit elements, cause the computer system to generate a gamut mapping unit configured to convert a plurality of input component values of a pixel of an image captured by an image sensor to a corresponding plurality of output component values of the pixel, wherein the input component values are in a first format which has a first valid component value range which includes some negative values and wherein the output component values are in a second format which has a second valid component value range which does not include negative values, wherein the gamut mapping unit comprises an adjusting module which includes:

a first adjustment block configured to, for each of the input component values of the pixel:

determine whether the input component value of the pixel is negative; and if it is determined that the input component value is negative, apply an initial adjustment to the input component value such that the adjusted input component value is not negative; and a second adjustment block configured to for each of the input component values of the pixel, if an initial adjustment has been applied to one or more of the other input component values of the pixel, adjust the input component value of the pixel based on: (i) the one or more initial adjustments applied to said one or more of the other input component values, and (ii) one or more parameters which set the amounts of the respective one or more initial adjustments which are to be transferred from said one or more of the other input component values to said input component value, to thereby compensate for the initial adjustment applied to said one or more of the other input component values, wherein respective parameters set the amounts of initial adjustments which are to be transferred for different transfers from one input component value to another input component value; and an output module configured to output the output component values of the pixel, wherein the output component values of the pixel are based on the adjusted input component values of the pixel.

* * * * *